United States Patent
Li et al.

(10) Patent No.: US 7,657,089 B2
(45) Date of Patent: Feb. 2, 2010

(54) AUTOMATIC CLASSIFICATION OF PHOTOGRAPHS AND GRAPHICS

(75) Inventors: Mingjing Li, Beijing (CN); Wei-Ying Ma, Beijing (CN); Yuanhao Chen, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 11/358,705

(22) Filed: Feb. 21, 2006

(65) Prior Publication Data

US 2007/0196013 A1 Aug. 23, 2007

(51) Int. Cl.
*G06K 9/00* (2006.01)
(52) U.S. Cl. .............. 382/170; 382/168; 382/173; 382/159; 382/224; 382/232
(58) Field of Classification Search .......... 382/168, 382/170, 173, 159, 224, 232, 239, 176; 707/104.1
See application file for complete search history.

(56) References Cited

U.S. PATENT DOCUMENTS

| | | | | |
|---|---|---|---|---|
| 6,381,363 | B1* | 4/2002 | Murching et al. | 382/164 |
| 7,305,151 | B2* | 12/2007 | Shiiyama | 382/305 |
| 7,425,963 | B2* | 9/2008 | Gargi et al. | 345/589 |
| 7,453,468 | B2* | 11/2008 | Ziobro | 345/596 |
| 2006/0147107 | A1* | 7/2006 | Zhang et al. | 382/159 |
| 2007/0076950 | A1* | 4/2007 | Shah | 382/170 |

OTHER PUBLICATIONS

Ng, Tian-Tsong, Shih-Fu Chang and Mao-Pei Tsui, "Physics-Motivated Features for Distinguishing Photographic Images and Computer Graphics," MM'05, Nov. 2005, Singapore, 2005 ACM, pp. 239-248.

Athitsos, Vassilis, Michael J. Swain and Charles Frankel, "Distinguishing Photographs and Graphics on the World Wide Web," 1997, Department of Computer Science, The University of Chicago, pp. 1-7.

Huang, Jing, S. Ravi Kumar, Mandar Mitra, Wei-Jing Zhu and Ramin Zabih, "Image Indexing Using Color Correlograms," 1997, Cornell University, Ithaca, New York, pp. 1-7.

Leinhart, Rainer and Alexander Hartmann, "Classifying Images on the Web Automatically," Intel Lab, Intel Corporation, Santa Clara, California, Oct. 2002 13 pages.

Stricker, Markus and Markus Orengo, "Similarity of Color Images," Communications Technology Laboratory, Swiss Federal Institute of Technology Laboratory, Switzerland, SPIE 1995, San Jose, California, pp. 1-12.

Friedman, Jerome, Trevor Hastie and Robert Tibshirani, "Additive Logistic Regression: a Statistical View of Boosting," Aug. 20, 1998, Stanford University, pp. 1-45.

* cited by examiner

*Primary Examiner*—Samir A. Ahmed
*Assistant Examiner*—Ali Bayat
(74) *Attorney, Agent, or Firm*—Perkins Coie LLP (57) ABSTRACT

A method and system for classifying an image as a photograph or a graphic based on a ranked prevalent color histogram feature or a ranked region size feature is provided. The prevalent color histogram feature contains counts of the colors that are most prevalent in the image sorted in descending order. The region size feature contains counts of the largest regions of the image sorted in descending order. The classification system then classifies the image based on the ranked prevalent color histogram feature and/or the ranked region size feature using a previously trained classifier.

12 Claims, 8 Drawing Sheets

AUTOMATIC CLASSIFICATION OF PHOTOGRAPHS AND GRAPHICS

BACKGROUND

The Internet is being increasingly used to search for and view images (e.g., photographs). To support this use, commercial search engine services have located and indexed over 1 billion images since 2005. Users who search for images often want to locate and view images that are either photographs or graphics. Photographs (e.g., portraits) are a class of images typically acquired by cameras and scanners, and graphics (e.g., chart or drawing) are a class of images generated by computers. A person searching for images may know the semantic content and the class of image of interest. For example, a person may want to locate a cartoon that contains a picture of a dog. After submitting an image query such as "dog cartoon," the user may be presented with hundreds of images as the search result and needs to review all the images to identify those images of the desired class. It would be helpful if the user could limit the search to only graphic images when searching for images generated by a computer.

Current commercial image search engines, however, do not allow a user to limit a search to photographic or graphic images. These search engines typically locate images of web pages based on text such as text surrounding the image or text of a file name or images of image forums based on text of metadata such as description, file name, and reviewer comments. This text may describe the semantic content of an image (e.g., "dogimage1.jpg") to a certain extent, but rarely classifies the image as being a photograph or graphic.

The classifying of images as a photograph or graphic is also useful in personal image management. A person may have thousands of images stored on their computer system and may want to search only for photographic images or only for graphic images. For example, a person may want to view only their personal photographs or may want to view only their collection of business graphics. Also, when automatically processing images, it can be important to distinguish photographs from graphics. For example, a person may want to add a border to all the photographs, but not to graphics.

Current techniques for classifying images as photographs or graphics are either inaccurate or computationally expensive. One technique tends to differentiate photographs from graphics based on various features of the images including the number of colors, most prevalent color, a farthest neighbor metric, and a saturation metric. Such a technique, however, has a relatively high error rate. Another technique uses image geometry to differentiate photographs from graphics. This technique, however, can take more than 50 seconds to classify an image, which makes the technique impractical for use in web-based image searching.

SUMMARY

A method and system for classifying an image as a photograph or a graphic based on a prevalent color histogram feature or a region size feature is provided. The classification system generates the prevalent color histogram feature by counting the number of pixels of the image that have similar colors. Each count represents a bin of similar colors. The classification system may define similar colors by quantizing the color values. The classification system then selects the bins with the largest counts and sorts them in descending order. The result is a ranked prevalent color histogram feature. The classification system then classifies the image based on the ranked prevalent color histogram feature using a previously trained classifier.

The classification system generates the region size feature of an image by segmenting the image into regions of similar colors. The classification system calculates the size of each region. The classification system then selects the sizes of the largest regions and sorts them in descending order. The result is a ranked region size feature. The classification system then classifies the image based on the ranked region size feature using a previously trained classifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for classifying an image as a photograph or a graphic based on a prevalent color histogram feature or a region size feature is provided. In one embodiment, the classification system generates a prevalent color histogram feature for an image to be classified. The classification system generates the prevalent color histogram feature by counting the number of pixels of the image that have similar colors. Each count represents a bin or group of similar colors. The classification system may define similar colors by quantizing the color values. For example, if the color of an image is represented in RGB space with an 8-bit value for each color, then the classification system may quantize the 8-bit values to 5-bit values of 32 bins. The classification system then counts the number of pixels in each bin. For example, the counts may specify 200 pixels in the bin for the quantized color value (0, 0, 0), 210 pixels in the bin for the quantized color value (0, 0, 1), 25 pixels in the bin for the quantized color value (0, 0, 2), and so on ending with 10 pixels in the bin for the quantized color value (31, 31, 31). The classification system then selects the bins with the largest counts and sorts them in descending order. The result is a ranked prevalent color histogram feature. The classification system then classifies the image based on the ranked prevalent color histogram feature using a previously trained classifier as described below. The use of a ranked prevalent color histogram feature allows the classification system to quickly and reliably classify images as photographs or graphics.

In an embodiment, the classification system generates a region size feature for an image to be classified. The classification system generates the region size feature by segmenting the image into regions of similar colors. For example, the classification system may use a watershed segmentation algorithm as described below to segment the image. The classification system then calculates the size of each region. The classification system then selects the sizes of the largest regions and sorts them in descending order. The result is a ranked region size feature. The classification system then classifies the images based on the ranked region size feature using a previously trained classifier as described below. The use of the ranked region size feature allows the classification system to quickly and reliably classify images as photographs or graphics.

In one embodiment, the classification system may use various combinations of features to generate a feature vector for classifying images as photographs or graphics. The classification system may use both the ranked prevalent color histogram feature and the ranked region size feature. In addition, the classification system may use a color moment feature, a correlograms feature, and a farthest neighbor histogram feature. The color moment feature characterizes the color distribution using color moments such as mean, standard deviation, and skewness for the H, S, and V channels of HSV space. (See, M. Stricker, and M. Orengo, "Similarity of color images," *Proceedings of SPIE Storage and Retrieval for Image and Video Databases Conference*, pp. 381-392, 1995.) The correlograms feature incorporates the spatial correlation of colors to provide texture information and describes the global distribution of the local spatial correlation of colors. (See, J. Huang, R. Kumar, and M. Mitra, "Image Indexing Using Color Correlograms," *Proc. CVPR*, pp. 762-768, 1997.) The classification system may simplify the process of extracting the correlograms features by quantizing the RGB colors and using the probability that the neighbors of a given pixel are identical in color as the feature. The farthest neighbor histogram feature identifies the pattern of color transitions from pixel to pixel. (See, V. Athitsos, M. J. Swain, and C. Frankel, "Distinguishing Photographs and Graphics on the World Wide Web," *IEEE Workshop on Content-Based Access of Image and Video Libraries*, pp. 10-17, June 1997.) The classification system may combine various combinations of features into the feature vector that is used to classify an image.

In one embodiment, the classification system trains a classifier based on image training data. The classification system generates a feature vector for each image of the training data. The feature vector may include various combinations of the features included in the ranked prevalent color histogram feature and the ranked region size feature. The classification system may also receive the classification of each image of the training data as a photograph or graphic. The classification system then trains the classifier using the feature vectors and classifications of the images. The classification system may use various classifiers. For example, the classification system may use a support vector machine ("SVM") classifier, an adaptive boosting ("AdaBoost") classifier, a neural network model classifier, and so on.

A support vector machine operates by finding a hypersurface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

Figure 1A:
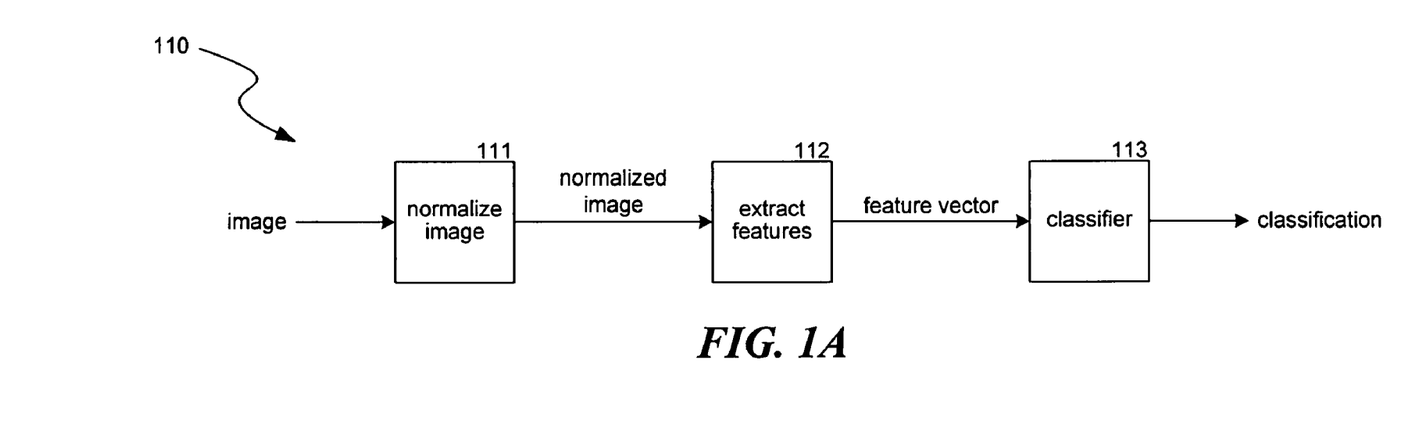
FIGS. 1A and 1B are block diagrams illustrating the classification of images and the training of a classifier, respectively.
Figure 1B:
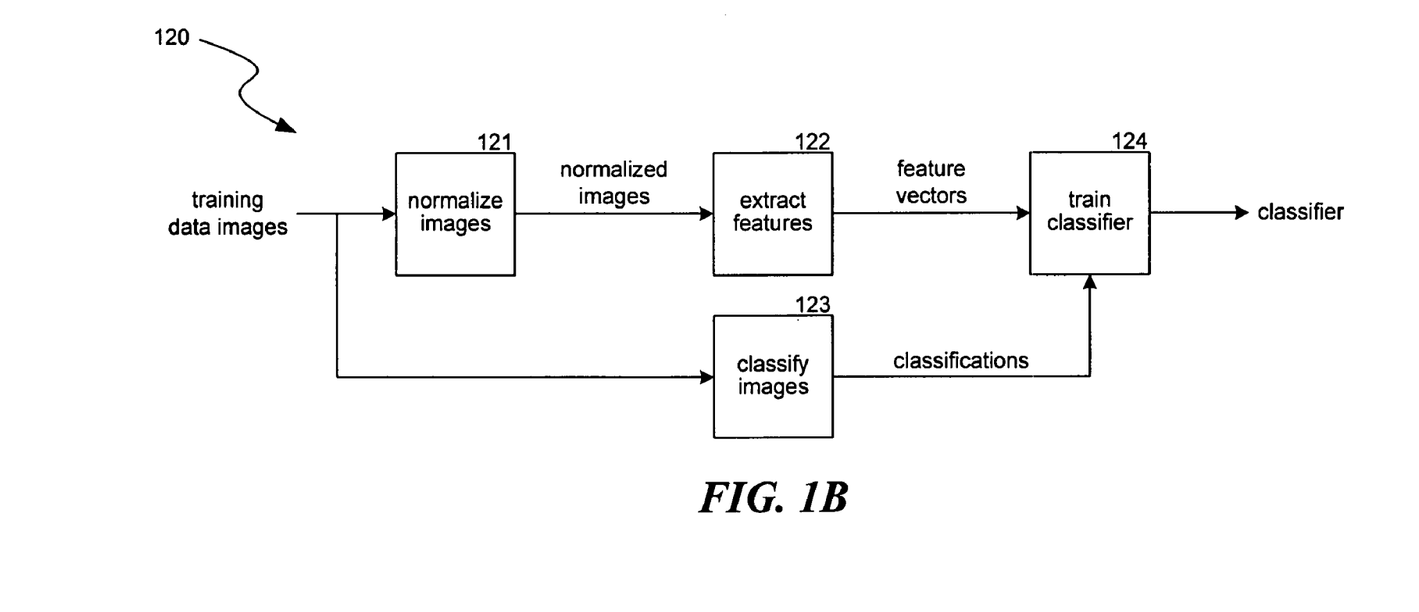

FIGS. 1A and 1B are block diagrams illustrating the classification of images and the training of a classifier, respectively. Block diagram 110 illustrates the classification of an image. The classification system first normalizes an image, using a normalization component 111, to a standard size that is typically small. The normalization reduces the computational cost of feature extraction and provides a common basis for the features. The classification system then extracts the features using an extract features component 112 to generate a feature vector for the image. The classification system then runs a classifier 113 with the feature vector as input to classify the image as a photograph or graphic. Block diagram 120 illustrates the training of the classifier. The classification system after collecting the training data normalizes the images using the normalize images component 121. The classification system also inputs the classification of each image as a photograph or graphic using the classify images component 123. The classify images component may receive a manual classification of the images. The classification system extracts features of the normalized images using an extract features component 122 to generate a feature vector for each image. The classification system then trains the classifier using the train classifier component 124 with the feature vectors and classifications as input.

Figure 2:
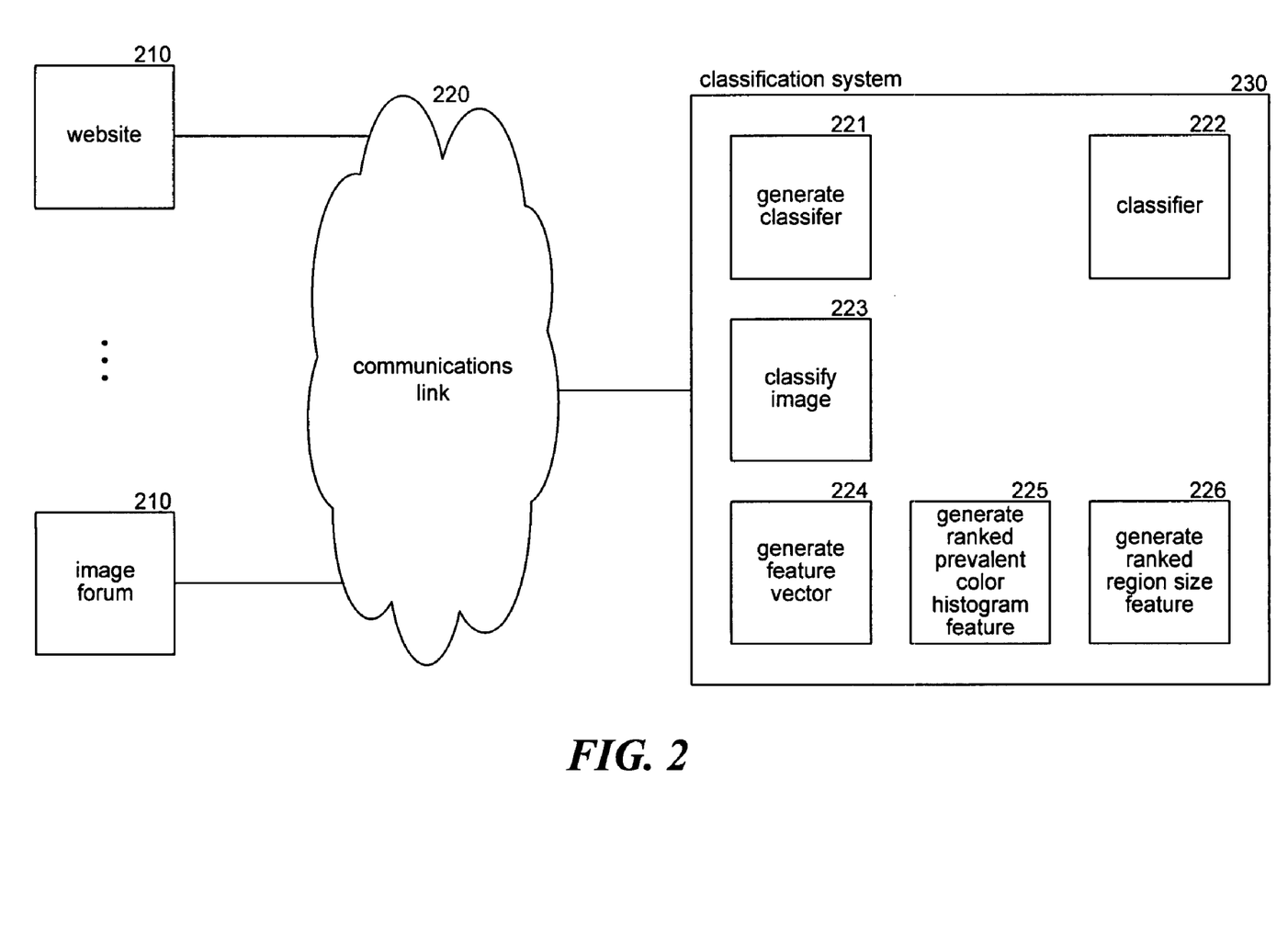
FIG. 2 illustrates the various components of the classification system in one embodiment.

FIG. 2 illustrates the various components of the classification system in one embodiment. The classification system 230 may be connected to various web sites and image forums 210 via a communications link 220. The classification system may crawl the web sites and image forums to collect images to be used as training data. The classification system includes a generate classifier component 221 and a classifier 222. The generate classifier component normalizes the images of the training data, generates the feature vectors for the images, and inputs the classifications of the images. The generate classifier component then trains the classifier. The classification system also includes a classify image component 223. The classify image component receives an image and classifies the image as a photograph or graphic. The classify image component normalizes the image, generates the feature vector for the image, and then runs the classifier with the generated feature vector to classify the image as a photograph or graphic. The classify image component invokes a generate feature vector component 224, a generate ranked prevalent color histogram feature component 225, and a generate ranked region size feature component 226.

The computing devices on which the classification system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the classification system. In addition, the data structures and message structures may be stored or transmitted via a data transmission medium, such as a signal on a communications link. Various communications links may be used, such as the Internet, a local area network, a wide area network, or a point-to-point dial-up connection.

The classification system may use various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The classification system may also provide its services to various computing systems such as personal computers, cell phones, personal digital assistants, consumer electronics, home automation devices, and so on.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the train classifier component may be implemented on a computer system separate from the computer system that classifies images using the classify image component.

Figure 3:
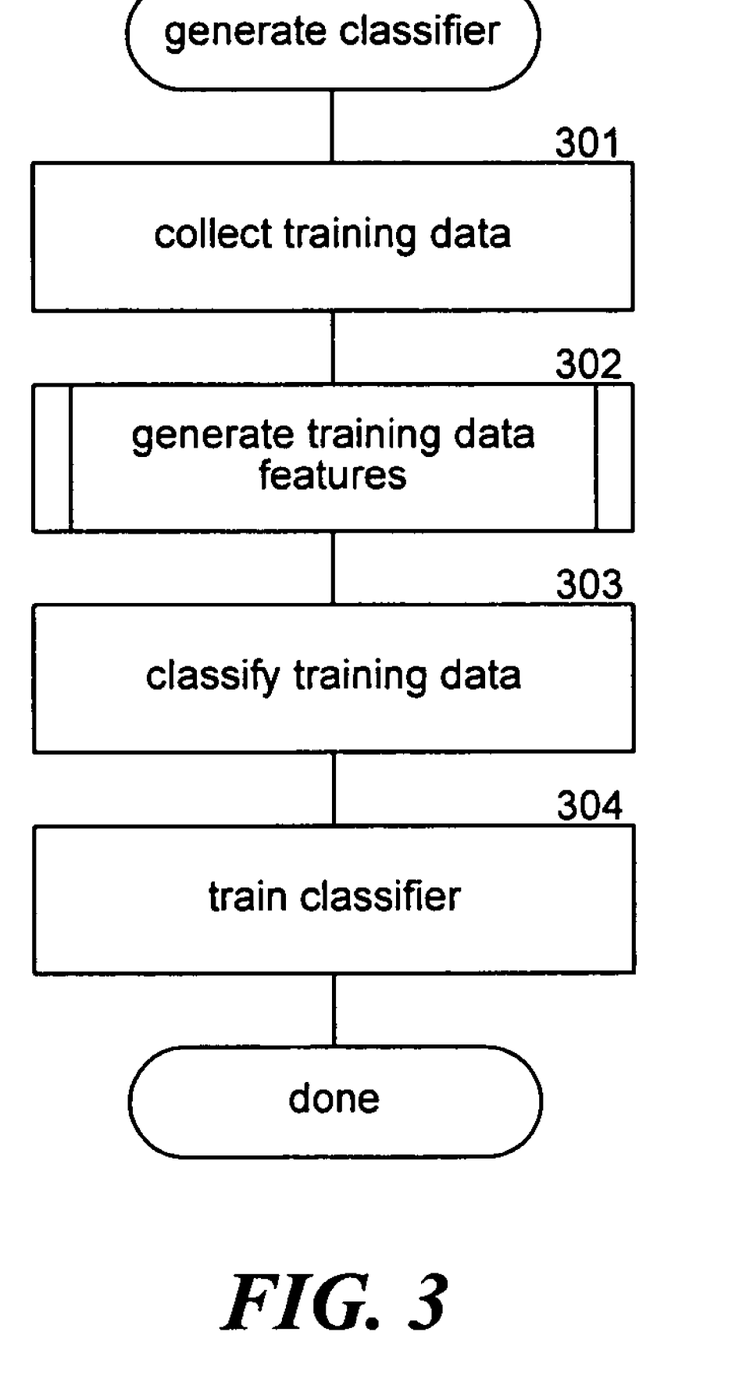
FIG. 3 is a flow diagram that illustrates the processing of the generate classifier component of the classification system in one embodiment.

FIG. 3 is a flow diagram that illustrates the processing of the generate classifier component of the classification system in one embodiment. In block 301, the component collects images for the training data by crawling various web sites and image forums. In block 302, the component invokes the generate training data features component to generate the feature vectors for the images of the training data. In block 303, the component classifies each image of the training data as a photograph or a graphic. In block 304, the component trains the classifier using the feature vectors and classifications and then completes.

Figure 4:
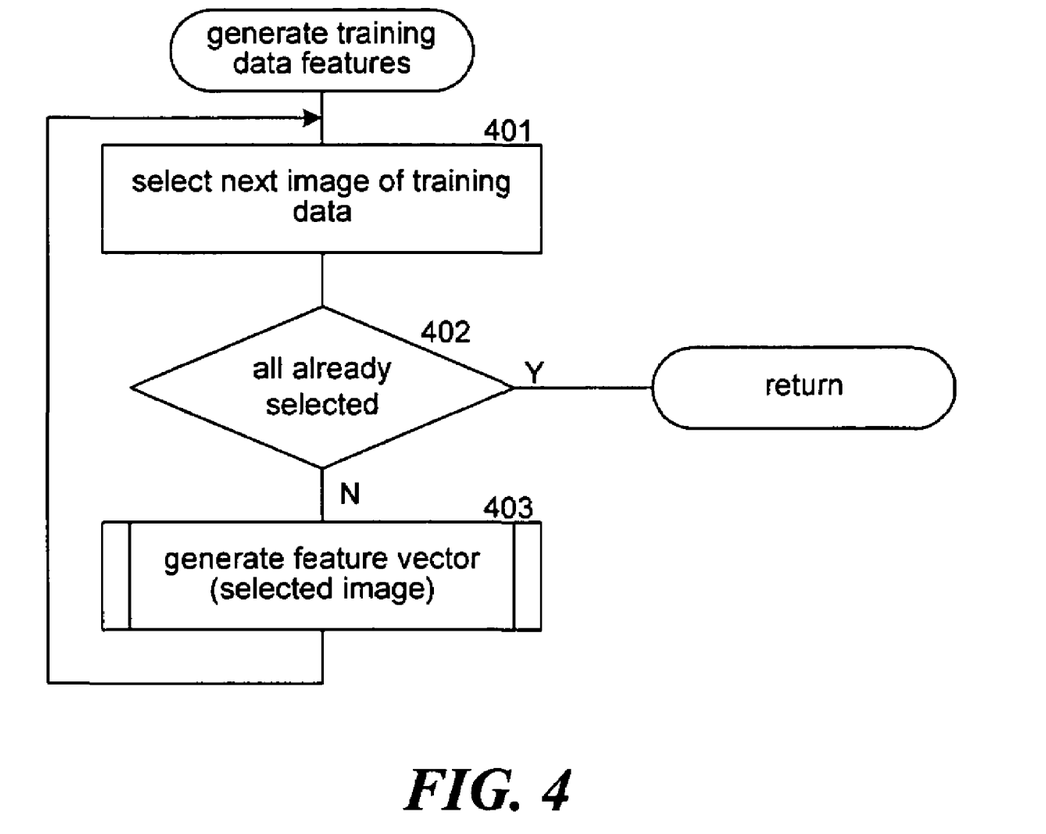
FIG. 4 is a flow diagram that illustrates the processing of the generate training data features component of the classification system in one embodiment.

FIG. 4 is a flow diagram that illustrates the processing of the generate training data features component of the classification system in one embodiment. The component loops selecting each image of the training data and generating its feature vector. In block 401, the component selects the next image of the training data. In decision block 402, if all the images of the training data have already been selected, then the component returns, else the component continues in block 403. In block 403, the component invokes the generate feature vector component passing the selected image. The component then loops to block 401 to select the next image.

Figure 5:
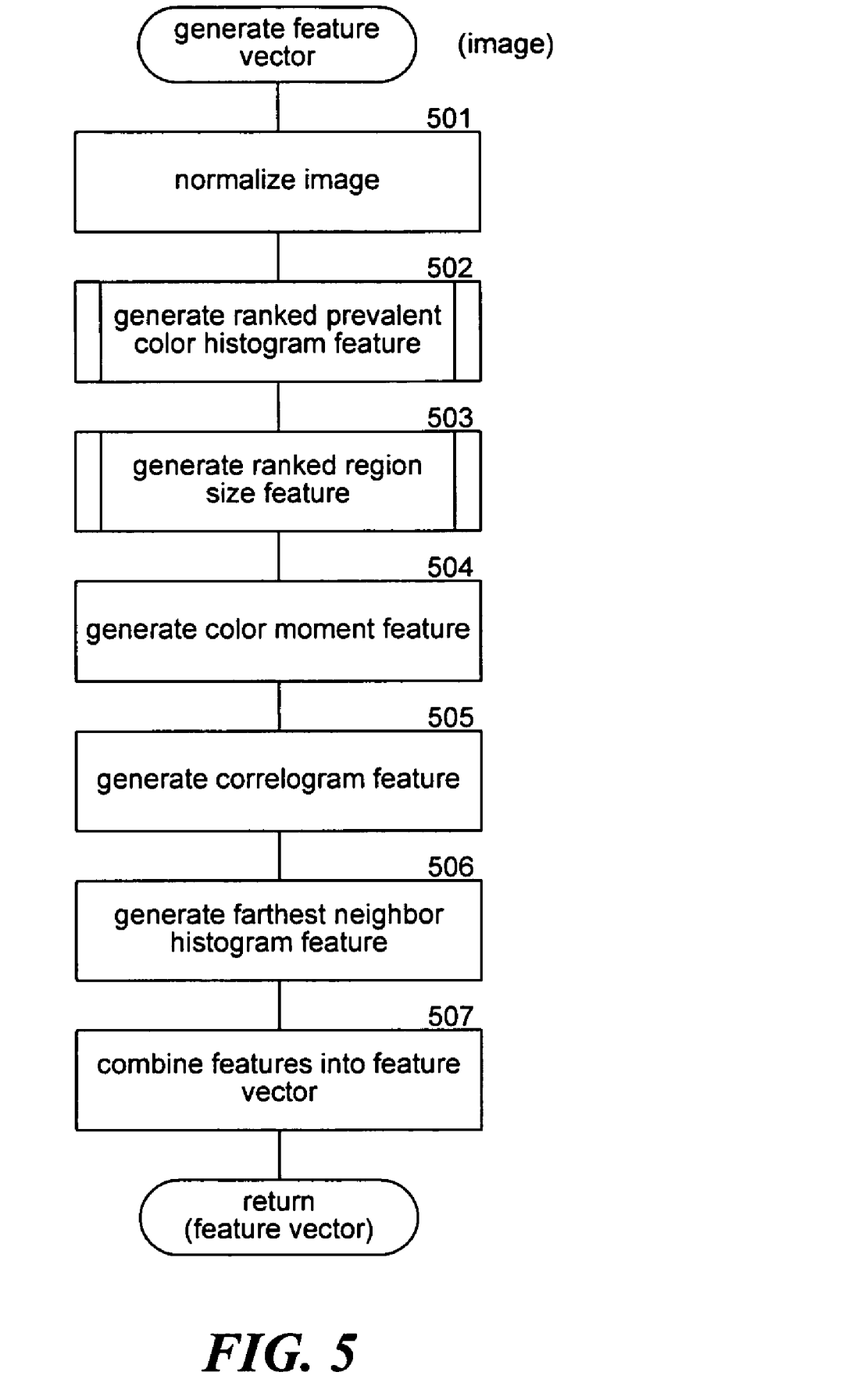
FIG. 5 is a flow diagram that illustrates the processing of the generate feature vector component of the classification system in one embodiment.

FIG. 5 is a flow diagram that illustrates the processing of the generate feature vector component of the classification system in one embodiment. The component is passed an image and returns a feature vector representing the image. In block 501, the component normalizes the image. In block 502, the component invokes the generate ranked prevalent color histogram feature component passing the image. In block 503, the component invokes the generate ranked region size feature component passing the image. In block 504, the component generates the moment feature for the image. In block 505, the component generates the correlograms feature for the image. In block 506, the component generates the farthest neighbor histogram feature for the image. In block 507, the component combines each of the features into a feature vector and then returns the feature vector.

Figure 6:
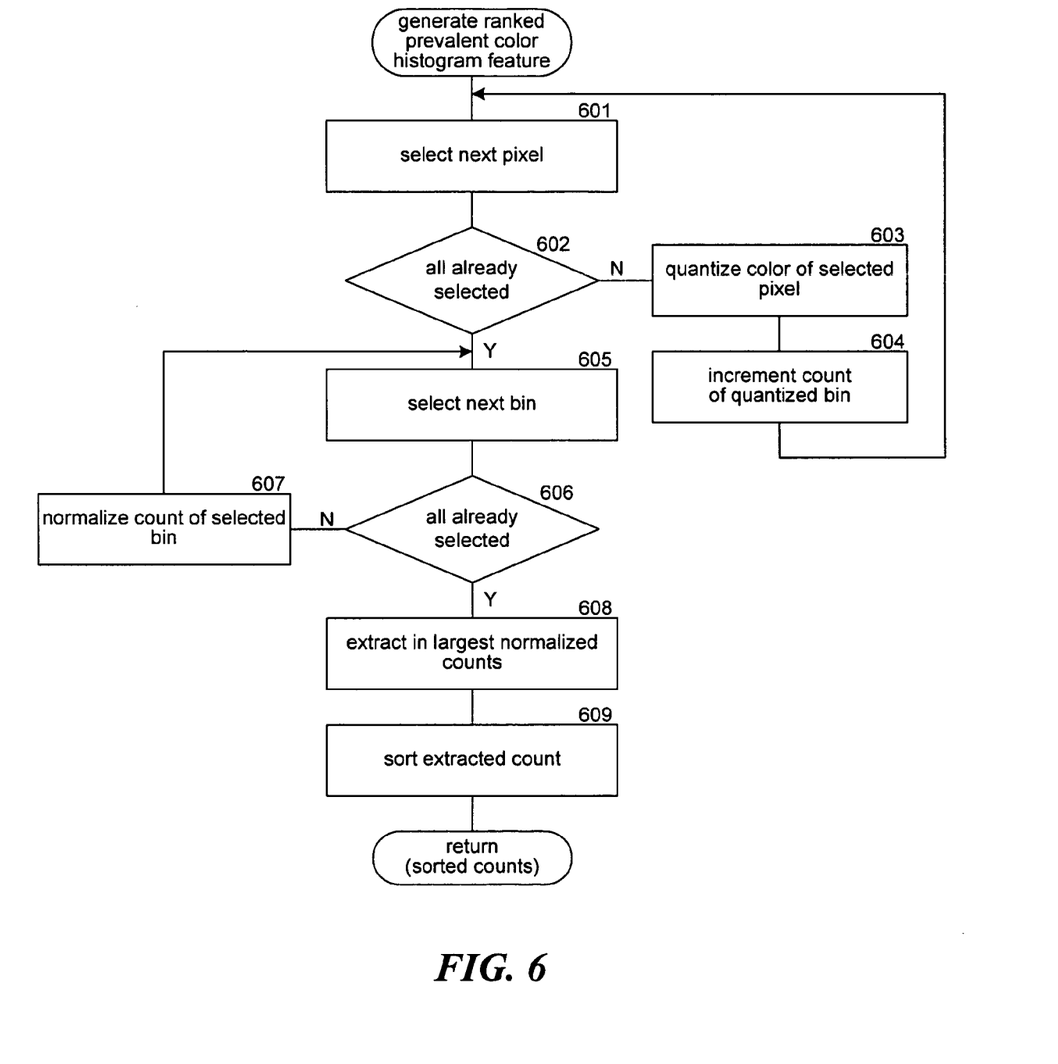
FIG. 6 is a flow diagram that illustrates the processing of the generate ranked prevalent color histogram feature component of the classification system in one embodiment.

FIG. 6 is a flow diagram that illustrates the processing of the generate ranked prevalent color histogram feature component of the classification system in one embodiment. The component is passed a normalized image and returns a ranked prevalent color histogram feature for the image. In blocks 601-604, the component loops quantizing the colors of the image. In block 601, the component selects the next pixel of the image. In decision block 602, if all the pixels have already been selected, then the component continues at block 605, else the component continues at block 603. In block 603, the component quantizes each of the RGB colors of the selected pixel. In block 604, the component increments the count of the bin corresponding to the quantized color. The component then loops to block 601 to select the next pixel. In blocks 605-607, the component loops normalizing counts of the bins. The component may use an L1 norm that effectively sets the normalized count to the percentage of the total number of pixels. In block 605, the component selects the next bin. In decision block 606, if all the bins have already been selected, then the component continues at block 608, else the component continues at block 607. In block 607, the component normalizes the count of the selected bin and then loops to block 605 to select the next bin. In block 608, the component extracts a certain number of the largest normalized counts. In block 609, the component sorts the extracted counts in descending order. The component then returns the sorted counts as the ranked prevalent color histogram feature.

Figure 7:
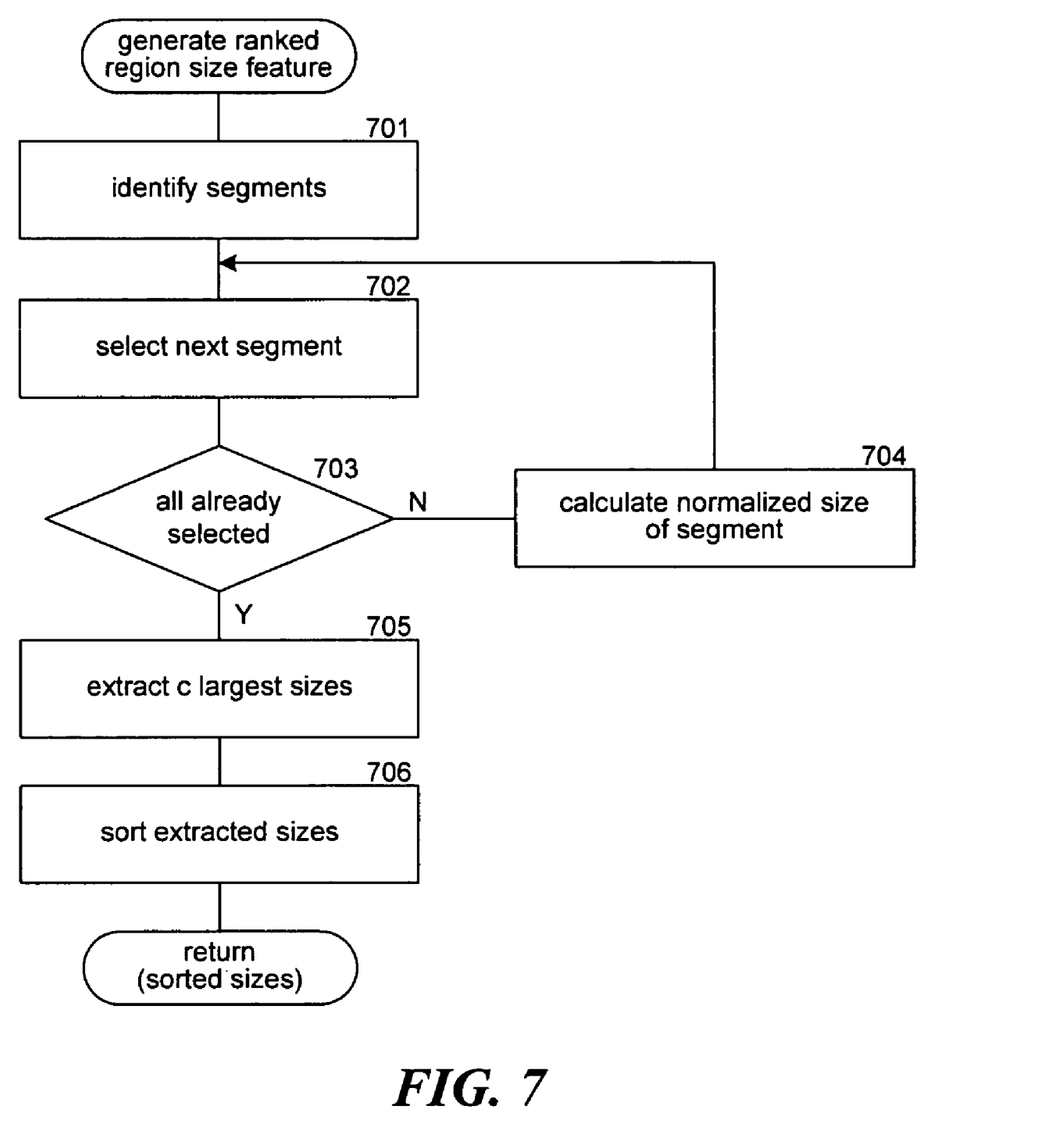
FIG. 7 is a flow diagram that illustrates the processing of the generate ranked region size feature component of the classification system in one embodiment.

FIG. 7 is a flow diagram that illustrates the processing of the generate ranked region size feature component of the classification system in one embodiment. The component is passed an image and generates a ranked region size feature for the image. In block 701, the component identifies the segments of the image that contain similar colors. In blocks 702-704, the component loops calculating the normalized size of each segment such as the size of the segment divided by the size of the image. In block 702, the component selects the next segment. In decision block 703, if all the segments have already been selected, then the component continues at block 705, else the component continues at block 704. In block 704, the component calculates the size of the selected segment and then loops to block 702 to select the next segment. In block 705, the component extracts a certain number of the largest sizes. In block 706, the component sorts the extracted sizes in descending order. The component then returns the sorted sizes as the ranked region size feature for the image.

In one embodiment, the classification system uses a watershed segmentation algorithm to identify the regions with similar colors. The classification system could, however, use any of a variety of well-known segmentation algorithms. A watershed segmentation algorithm segments regions of an image into "catchment basins." These basins are low points in the intensity of the image being segmented. The basins represent the segments, and the basins share boundaries. The algorithm conceptually fills the basins with rainwater. As the water level rises, the basins fill and water spills across the boundaries, joining those basins into larger basins. The final height of the water level controls the number of basins. A large final height results in fewer basins because adjacent basins with boundaries below the final height are joined, and a small final height results in more basins because fewer are joined. (See, L. Vincent, and P. Soille, "Watersheds in Digital Spaces: An efficient Algorithm Based on Immersion Simulations," IEEE Transactions on Pattern Analysis and Machine Intelligence, 13(6):583-598, June 1991.) The classification system may define the distance between two pixels $p_1$ and $p_2$ for the watershed segmentation by the following equation:

$$d=|r_1-r_2|+|g_1-g_2|+|b_1-b_2|, \qquad (1)$$

where d represents the distance and $(r_1,g_1,b_1)$ and $(r_2,g_2,b_2)$ represent colors for pixels $p_1$ and $p_2$, respectively. The classification system defines a neighbor $p_2$ of $p_1$ as in the same region of $p_1$ if the distance between them is smaller than a predefined threshold.

Figure 8:
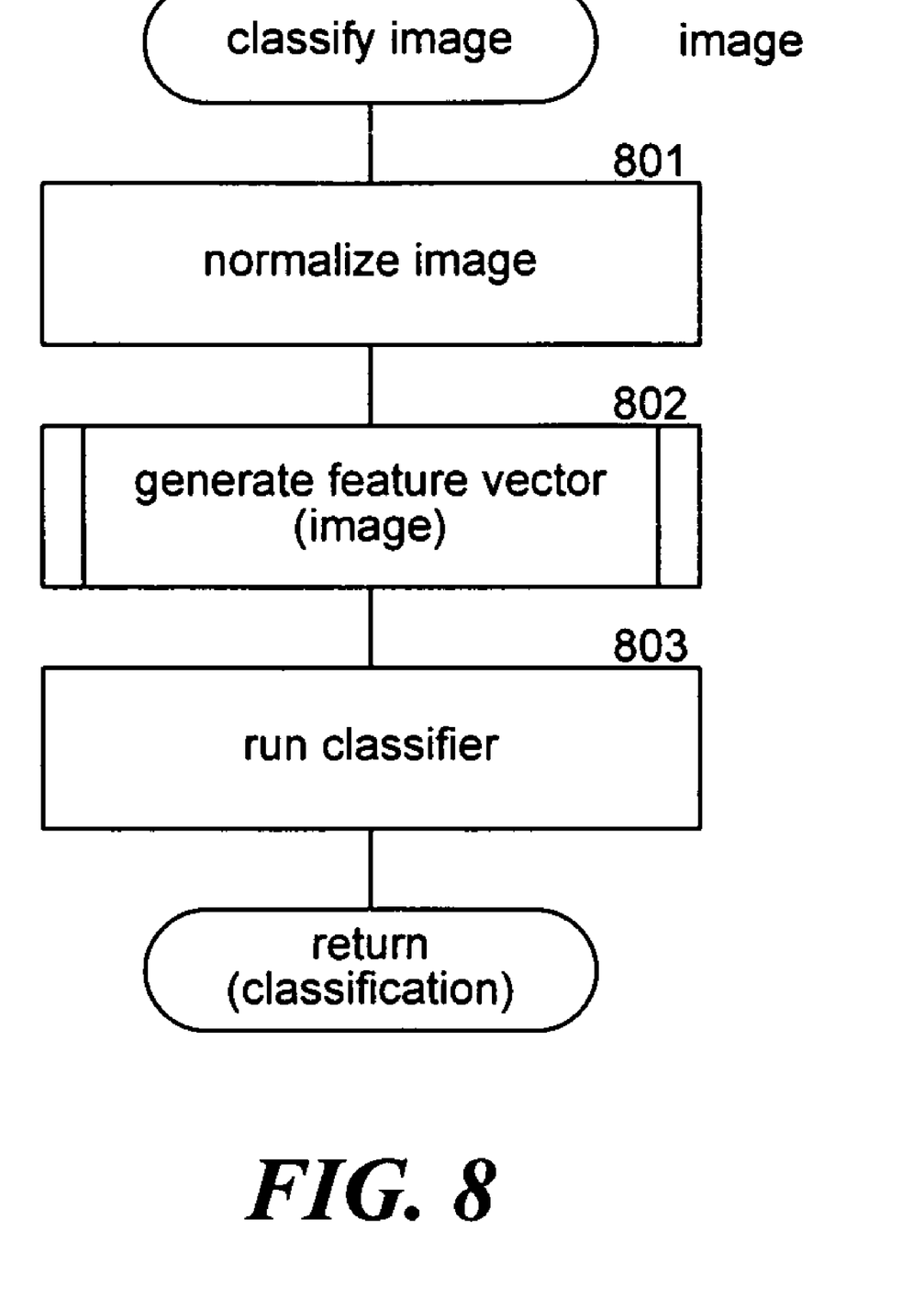
FIG. 8 is a flow diagram that illustrates the processing of the classify images component of the classification system in one embodiment.

FIG. 8 is a flow diagram that illustrates the processing of the classify images component of the classification system in one embodiment. The component is passed an image and classifies the image as either a photograph or a graphic. In block 801, the component normalizes the image. In block 802, the component invokes the generate feature vector component passing the image. In block 803, the component runs the classifier using the generated feature vector. The component then returns the classification output by the classifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the classification could use no ranking or partial ranking of counts or region sizes, rather than complete ranking. Accordingly, the invention is not limited except as by the appended claims.

We claim:

1. A system for classifying an image as a photograph or a graphic, comprising:
    a memory storing computer-executable instructions of:
        a component that extracts a prevalent color histogram feature for an image, the prevalent color histogram feature being based on the number of pixels of the image that contain similar colors;
        a component that generates a ranked prevalent color histogram feature representing an ordering of the colors based on the number of pixels of that image that contain similar colors; and
        a classifier that classifies the image as a photograph or graphic based on the ranked prevalent color histogram feature, the classifier trained using training data that includes ranked prevalent color histogram features of training images and a label for each training image indicating whether the image is a photograph or a graphic; and
    a processor for executing the computer-executable instructions stored in the memory.

2. The system of claim 1 wherein the similar colors are identified by quantizing the colors of the pixels.

3. The system of claim 1 wherein the counts of pixels are normalized.

4. The system of claim 1 including a component that normalizes the size of the image before the prevalent color histogram feature is extracted.

5. The system of claim 1 wherein the prevalent color histogram feature contains a certain number of the largest counts of pixels that have similar colors.

6. The system of claim 1 wherein the classifier is based on an adaptive boosting classification algorithm.

7. A system for classifying an image as a photograph or a graphic, comprising:
    a memory storing computer-executable instructions of:
        a component that extracts a region size feature for an image, a region size being the size of a region of the image that contains similar colors, a region being a contiguous area of the image;
        a component that normalizes the extracted region size feature for an image based on the size of the image; and
        a classifier that classifies the image as a photograph or graphic based on the normalized region size feature; and
    a processor for executing the computer-executable instructions stored in the memory.

8. The system of claim 7 wherein the similar colors are identified by a distance metric.

9. The system of claim 7 wherein the regions of the image are identified using a watershed segmentation algorithm.

10. The system of claim 7 wherein the region size feature contains the sizes of a certain number of the largest regions of the image.

11. The system of claim 10 wherein the largest region sizes are ordered by size.

12. The system of claim 7 including a component that generates the classifier by extracting a region size feature for images of training data, identifying the classifications of the images, and training the classifier using the region size features and classification of the images.

* * * * *

UNITED STATES PATENT AND TRADEMARK OFFICE
CERTIFICATE OF CORRECTION

PATENT NO.       : 7,657,089 B2                                         Page 1 of 1
APPLICATION NO. : 11/358705
DATED            : February 2, 2010
INVENTOR(S)      : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Thirtieth Day of November, 2010

David J. Kappos
*Director of the United States Patent and Trademark Office*